(12) United States Patent
Yoshimura et al.

(10) Patent No.: US 10,719,436 B2
(45) Date of Patent: Jul. 21, 2020

(54) MANAGEMENT DEVICE, INFORMATION PROCESSING DEVICE, AND MANAGEMENT METHOD

(71) Applicant: Kabushiki Kaisha Toshiba, Minato-ku (JP)

(72) Inventors: Shiyo Yoshimura, Yokohama (JP); Tatsunori Kanai, Yokohama (JP); Yusuke Shirota, Yokohama (JP); Satoshi Shirai, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/689,009

(22) Filed: Aug. 29, 2017

(65) Prior Publication Data

US 2018/0253374 A1 Sep. 6, 2018

(30) Foreign Application Priority Data

Mar. 3, 2017 (JP) .................................. 2017-040993

(51) Int. Cl.
| | |
|---|---|
| *G06F 12/02* | (2006.01) |
| *G06F 3/06* | (2006.01) |
| *G06F 16/22* | (2019.01) |
| *G06F 12/0868* | (2016.01) |
| *G06F 12/1027* | (2016.01) |
| *G06F 16/23* | (2019.01) |

(52) U.S. Cl.
CPC ........ *G06F 12/0246* (2013.01); *G06F 3/0602* (2013.01); *G06F 3/064* (2013.01);
(Continued)

(58) Field of Classification Search
CPC ............... G06F 12/0246; G06F 3/0602; G06F 17/30002
See application file for complete search history.

(56) References Cited

U.S. PATENT DOCUMENTS 5,485,595 A * 1/1996 Assar .................... G06F 3/0601
365/185.11
6,000,006 A * 12/1999 Bruce ................. G06F 11/1068
711/103
(Continued)

FOREIGN PATENT DOCUMENTS

JP 2008-146254 A 6/2008
JP 2008-146255 6/2008

*Primary Examiner* — Francisco A Grullon
(74) *Attorney, Agent, or Firm* — Oblon, McClelland, Maier & Neustadt, L.L.P.

(57) ABSTRACT

According to an embodiment, a management device includes a counter storage unit, a first management information storage unit, and an update unit. The first management information storage unit stores a first management table capable of storing first management information about each of a predetermined number of first areas. The first management information indicates whether each second area included in a corresponding first area has data written therein. In response to writing of first data into the nonvolatile memory, when a state of a target second area indicated in the first management information about a target first area is an unwritten state, the update unit changes the state of the target second area to a written state; while when the state of the target second area indicated in the first management information is the written state, the update unit updates the counter value for the target first area.

15 Claims, 17 Drawing Sheets

(52) U.S. Cl.
CPC .......... *G06F 3/0616* (2013.01); *G06F 3/0679* (2013.01); *G06F 3/0688* (2013.01); *G06F 12/0868* (2013.01); *G06F 12/1027* (2013.01); *G06F 16/22* (2019.01); *G06F 16/23* (2019.01); *G06F 2212/1016* (2013.01); *G06F 2212/222* (2013.01); *G06F 2212/7201* (2013.01); *G06F 2212/7202* (2013.01); *G06F 2212/7203* (2013.01); *G06F 2212/7211* (2013.01)

(56) References Cited

U.S. PATENT DOCUMENTS

| | | | | |
|---|---|---|---|---|
| 7,240,156 B2* | 7/2007 | Hoshino | ............... | G06F 12/084 710/54 |
| 7,660,941 B2* | 2/2010 | Lee | ............... | G06F 12/0246 711/103 |
| 2007/0204128 A1* | 8/2007 | Lee | ............... | G06F 12/0246 711/173 |
| 2012/0060063 A1* | 3/2012 | Sakurai | ............... | G06F 9/4406 714/49 |
| 2012/0072683 A1* | 3/2012 | Iliadis | ............... | G06F 12/0246 711/159 |
| 2012/0260038 A1* | 10/2012 | Imazaki | ............... | G06F 3/0608 711/114 |
| 2014/0359238 A1* | 12/2014 | Imazaki | ............... | C09K 5/16 711/162 |
| 2015/0255126 A1* | 9/2015 | Khwa | ............... | G11C 29/50008 365/168 |
| 2016/0239207 A1* | 8/2016 | Takakura | ............... | G06F 3/0604 |

* cited by examiner

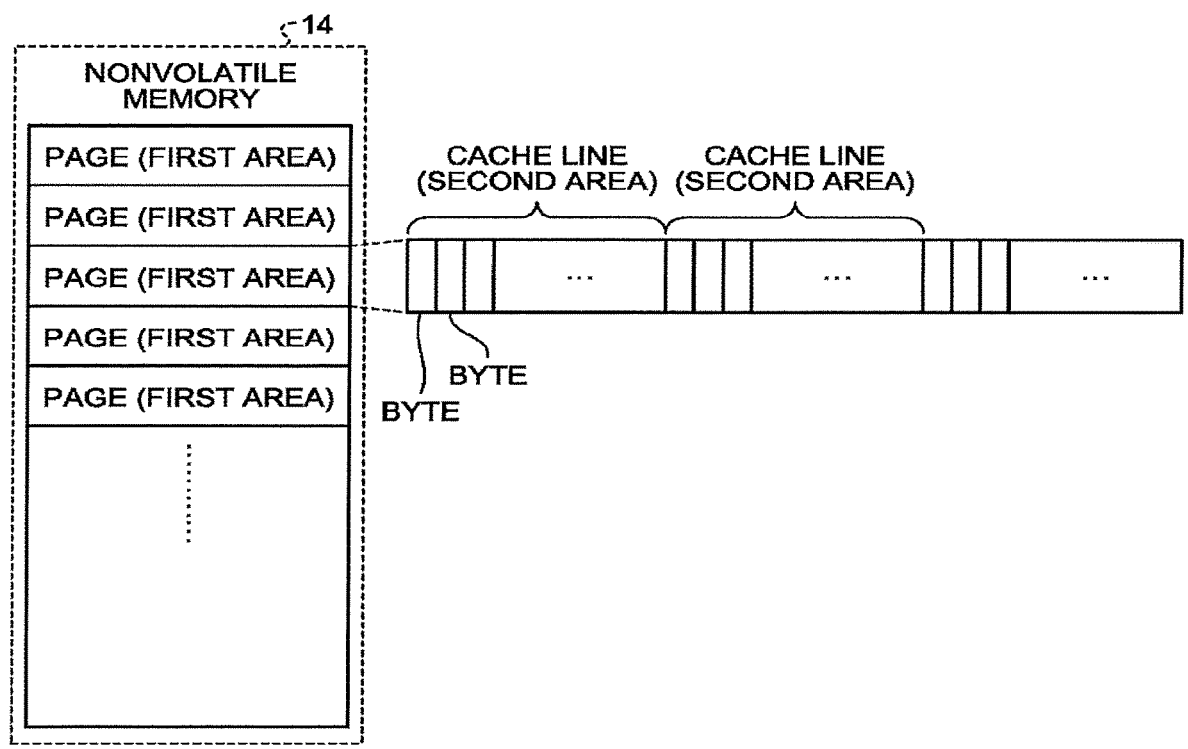

COUNTER TABLE

| PAGE NUMBER (IDENTIFICATION INFORMATION) | COUNTER VALUE |
|---|---|
| 0 | 5 |
| 1 | 2 |
| 2 | 1 |
| 3 | 3 |
| ⋮ | ⋮ |

FIG.7

MANAGEMENT TABLE

| ENTRY NUMBER | PAGE NUMBER (IDENTIFICATION INFORMATION) | MAP INFORMATION CACHE LINE NUMBER | | | | | | |
|---|---|---|---|---|---|---|---|---|
| | | 0 | 1 | 2 | 3 | 4 | 5 | ......... |
| 0 | 5 | 0 | 1 | 1 | 0 | 0 | 1 | ......... |
| 1 | 2 | 1 | 0 | 0 | 0 | 0 | 0 | ......... |
| 2 | 12 | 0 | 0 | 0 | 0 | 1 | 0 | ......... |
| 3 | 3 | 0 | 0 | 1 | 0 | 0 | 0 | ......... |
| ⋮ | ⋮ | | | | | | | |
| 63 | 4 | 0 | 0 | 1 | 0 | 0 | 1 | ......... |

FIG.13

COUNTER TABLE

| BLOCK NUMBER (FIRST IDENTIFICATION INFORMATION) | COUNTER VALUE |
|---|---|
| 0 | 5 |
| 1 | 2 |
| 2 | 1 |
| 3 | 3 |
| ⋮ | ⋮ |

FIG.14

FIRST MANAGEMENT TABLE

| ENTRY NUMBER | BLOCK NUMBER (FIRST IDENTIFICATION INFORMATION) | FIRST MAP INFORMATION PAGE NUMBER | | | | | | |
|---|---|---|---|---|---|---|---|---|
| | | 0 | 1 | 2 | 3 | 4 | 5 | ......... |
| 0 | 4 | 0 | 1 | 1 | 0 | 1 | 0 | ......... |
| 1 | 7 | 0 | 1 | 0 | 1 | 1 | 1 | ......... |
| 2 | 15 | 1 | 1 | 0 | 1 | 0 | 0 | ......... |
| 3 | 2 | 0 | 0 | 0 | 0 | 0 | 1 | ......... |
| ⋮ | ⋮ | | | | | | | |
| 63 | 3 | 1 | 1 | 0 | 0 | 1 | 1 | ......... |

FIG.15

SECOND MANAGEMENT TABLE

| ENTRY NUMBER | BLOCK NUMBER/ PAGE NUMBER (SECOND IDENTIFICATION INFORMATION) | SECOND MAP INFORMATION CACHE LINE NUMBER | | | | | | |
|---|---|---|---|---|---|---|---|---|
| | | 0 | 1 | 2 | 3 | 4 | 5 | ......... |
| 0 | 0/0 | 1 | 0 | 1 | 0 | 0 | 0 | ......... |
| 1 | 3/2 | 1 | 0 | 0 | 1 | 0 | 0 | ......... |
| 2 | 3/5 | 0 | 0 | 1 | 1 | 1 | 0 | ......... |
| 3 | 5/5 | 0 | 1 | 0 | 1 | 0 | 1 | ......... |
| ⋮ | ⋮ | | | | | | | |
| 64 | 7/3 | 1 | 1 | 0 | 0 | 1 | 0 | ......... |

| TLB | | | MAP INFORMATION |
|---|---|---|---|
| LOGICAL ADDRESS | PHYSICAL ADDRESS | | |
| | | | |
| | | | |
| | | | |

MANAGEMENT DEVICE, INFORMATION PROCESSING DEVICE, AND MANAGEMENT METHOD

CROSS-REFERENCE TO RELATED APPLICATIONS

This application is based upon and claims the benefit of priority from Japanese Patent Application No. 2017-040993, filed on Mar. 3, 2017; the entire contents of which are incorporated herein by reference.

FIELD

Embodiments described herein relate generally to a management device, an information processing device, and a management method.

BACKGROUND

A nonvolatile memory such as a NAND flash has a reduced number of rewrites. For that reason, an information processing device managing the nonvolatile memory performs wear leveling control. Specifically, the information processing device counts the number of rewrites of the nonvolatile memory and stores it in a table. Then, with reference to a value stored in the table, the information processing device controls a writing position so that data are written on average to the whole storage area of the nonvolatile memory. Owing to performance of such wear leveling control, the information processing device can extend the life of the nonvolatile memory.

In recent years, high-speed nonvolatile memories, also called as storage class memories, have been developed. In the storage class memories, data is written in units of byte or in units of cache line. Therefore, in order to accurately perform wear leveling control, the information processing device needs to manage the number of rewrites in units of byte or in units of a cache memory. However, when the number of rewrites is managed in this way, the size of the table considerably increased, and the information processing device needs to include a very large memory.

While, for example, it is also considered to count the number of rewrites only in units of page, and not count the number of rewrites in units of byte or in units of a cache memory. However, when the number of rewrites is managed in such a way, the information processing device cannot distinguish between writing data into a different byte or into a different cache line within a page and writing data into the same byte or into the same cache line, and the wear leveling control cannot be achieved with high accuracy.

BRIEF DESCRIPTION OF THE DRAWINGS

FIG. 3 is a diagram illustrating a configuration of a nonvolatile memory according to a first embodiment;

FIG. 4 is a diagram illustrating an example of address information according to the first embodiment;

FIG. 7 is a diagram illustrating an example of a management table according to the first embodiment;

FIG. 13 is a diagram illustrating an example of a counter table according to the second embodiment;

FIG. 14 is a diagram illustrating an example of a first management table according to the second embodiment;

FIG. 15 is a diagram illustrating an example of a second management table according to the second embodiment;

DETAILED DESCRIPTION

According to an embodiment, a management device manages a nonvolatile memory. The nonvolatile memory includes a plurality of first areas. Each of the plurality of first areas includes a plurality of second areas. The management device includes a counter storage unit, a first management information storage unit, and an update unit. The counter storage unit is configured to store therein a counter value for each of the plurality of first areas. The first management information storage unit is configured to store therein a first management table capable of storing first management information about each of a predetermined number of first areas. The update unit is configured to update the counter value and the first management table. The first management information indicates whether each of a plurality of second areas included in a corresponding first area has data written therein. In response to writing of first data into the nonvolatile memory, when a state of a target second area indicated in the first management information about a target first area is an unwritten state, the update unit changes the state of the target second area to a written state. The target first area is the first area into which the first data is to be written. The target second area is the second area into which the first data is to be written. When the state of the target second area indicated in the first management information is the written state, the update unit updates the counter value for the target first area.

An information processing device 10 according to embodiments will be described below in detail with reference to the drawings. It is an object of the present embodiment to provide the information processing device 10 having a small storage capacity to accurately manage the number of rewrites for each area in a nonvolatile memory 14.

First Embodiment

Figure 1:
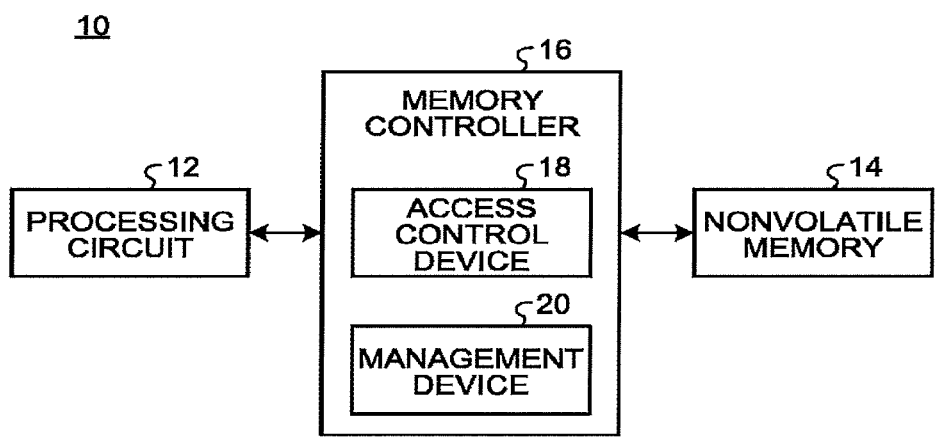
FIG. 1 is a diagram illustrating an exemplary hardware configuration of an information processing device.

FIG. 1 is a diagram illustrating an exemplary hardware configuration of the information processing device 10. The information processing device 10 includes a processing circuit 12, the nonvolatile memory 14, and a memory controller 16.

The processing circuit 12 has at least one processor. The processor is, for example, a central processing unit (CPU). The processor may include at least one CPU core. The processing circuit 12 executes a program and processes data. The processing circuit 12 reads data from the nonvolatile memory 14 or writes data to the nonvolatile memory 14 in accordance with execution of a program.

Furthermore, the processing circuit 12 includes a cache memory. The processing circuit 12 temporarily stores data stored in the nonvolatile memory 14.

The nonvolatile memory 14 is a memory retaining data without any power supply. The nonvolatile memory 14 functions, for example, as a main memory of the processing circuit 12. Data can be written into the nonvolatile memory 14, in units of small areas such as bytes.

The nonvolatile memory 14 has, for example, magnetoresistive random access memory (MRAM), phase change memory (PCM), phase random access memory (PRAM), phase change random access memory (PCRAM), resistance random access memory (ReRAM), ferroelectric random access memory (FeRAM), 3DXPoint, or memristor. The nonvolatile memory 14 may be a memory called storage class memory (SCM). Furthermore, the nonvolatile memory 14 may be a module in which a plurality of semiconductor devices are provided on one substrate, casing, or the like.

The memory controller 16 includes an access control device 18 and a management device 20. The access control device 18 processes an access request from the processing circuit 12 to the nonvolatile memory 14. The access control device 18 writes data to the nonvolatile memory 14 according to a write command from the processing circuit 12. Furthermore, the access control device 18 reads data from the nonvolatile memory 14 according to a read command from the processing circuit 12.

The management device 20 performs wear leveling control on the nonvolatile memory 14. Specifically, the management device 20 receives address information indicating a position to which data is to be written upon writing the data to the nonvolatile memory 14. On the basis of the received address information, the management device 20 manages the number of data rewrites for each of first areas in the nonvolatile memory 14. Each of the first areas corresponds to, for example, a data unit (e.g., page) managed by the processing circuit 12. Furthermore, the first area may correspond to a data unit being predetermined number times the data unit management by the processing circuit 12, or the like.

Then, the management device 20 gives the access control device 18 the number of data rewrites for each first area in the nonvolatile memory 14. The access control device 18 controls a position into which data is written on the basis of the acquired number of rewrites so that data are written on average to the whole area in the nonvolatile memory 14. The management device 20 may give the number of rewrites to an apparatus provided outside the memory controller 16 or an operating system executed by the processing circuit 12, or the like. In this configuration, the device that has received the number of rewrites controls the position into which data is written so that data are written on average to the whole areas in the nonvolatile memory 14 on the basis of the acquired number of rewrites.

Figure 2:
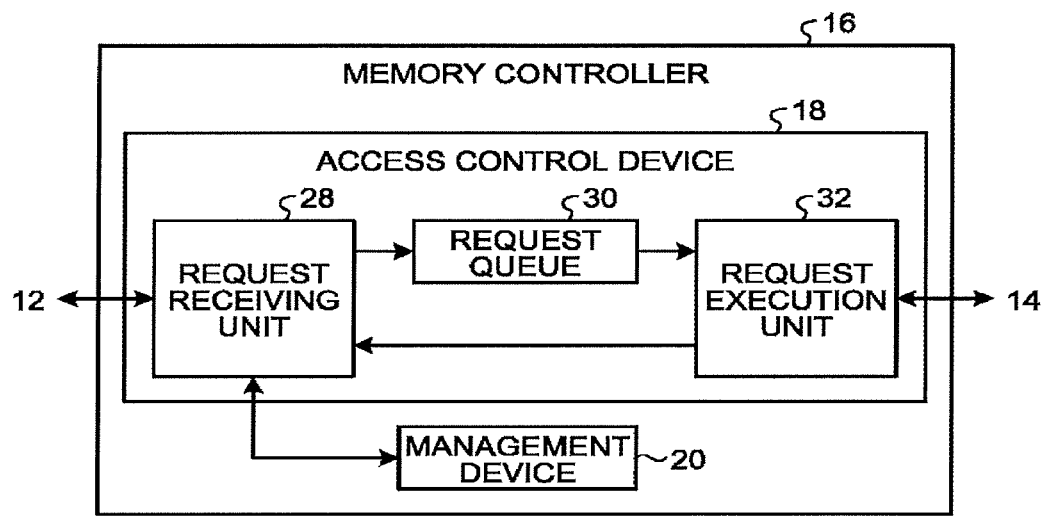
FIG. 2 is a diagram illustrating a configuration of an access control device of a memory controller.

FIG. 2 is a diagram illustrating a configuration of the access control device 18 of the memory controller 16, which is illustrated with the management device 20. The access control device 18 includes a request receiving unit 28, a request queue 30, and a request execution unit 32.

The request receiving unit 28 receives a write command and a read command from the processing circuit 12 to the nonvolatile memory 14. The request receiving unit 28 stores the received write command and read command in the request queue 30. The request queue 30 is, for example, a first-in first-out memory.

The request execution unit 32 fetches a write command and a read command stored in the request queue 30. Upon fetch of the write command, the request execution unit 32 writes data to a specified address in the nonvolatile memory 14. Upon fetch of the read command, the request execution unit 32 reads data from the specified address in the nonvolatile memory 14 and gives the data to the request receiving unit 28. Upon reception of the data read from the nonvolatile memory 14, the request receiving unit 28 returns the received data to the processing circuit 12.

When receiving a write command from the processing circuit 12, the management device 20 acquires address information indicating a position to which data in the nonvolatile memory 14 is to be written. For example, the management device 20 receives the address information from the request receiving unit 28 and detects the position to which data is written. In a case when data is batchedly written into, for example, a page or the like, the management device 20 may receive data size and address information representing the first position to which data is to be written to detect the position to which data is to be written. The management device 20 may acquire address information and the like from the request queue 30 or the request execution unit 32.

FIG. 3 is a diagram illustrating a configuration of the nonvolatile memory 14 according to a first embodiment. The nonvolatile memory 14 includes a plurality of first areas. In the first embodiment, each of the first areas is a unit called page. The page is a data unit managed by the processing circuit 12. The pages correspond to, for example, pages of a virtual storage device managed by the operating system. The pages each may be, for example, 4 Kbytes.

Each of the plurality of first areas includes a plurality of second areas. In the first embodiment, each of the plurality of second areas is a unit called cache line. The cache line corresponds to a data unit rewritten into the cache memory in the processing circuit 12. The processing circuit 12 rewrites data to the nonvolatile memory 14 in units of cache lines.

The cache line is, for example, 64 bytes. Note that the second area may be a unit (e.g., byte) smaller than the cache line.

FIG. 4 is a diagram illustrating an example of address information for specifying a destination to which data is written in the nonvolatile memory 14 according to the first embodiment. The management device 20 acquires address information divided into three bit fields as illustrated in FIG. 4, from the access control device 18.

An upper bit field of the address information indicates the position of a page to which data is to be written (target first area). A middle bit field of the address information indicates the position of a cache line to which the data is written (target second area) in the target first area. A lower bit field of the address information indicates the position of a byte to which the data is written in the target second area.

Therefore, acquisition of values of specific bit fields in the obtained address information enables the management device 20 to specify a page (target first area) to which data is written and a cache line (target second area) to which data is written.

Figures 5, 6:
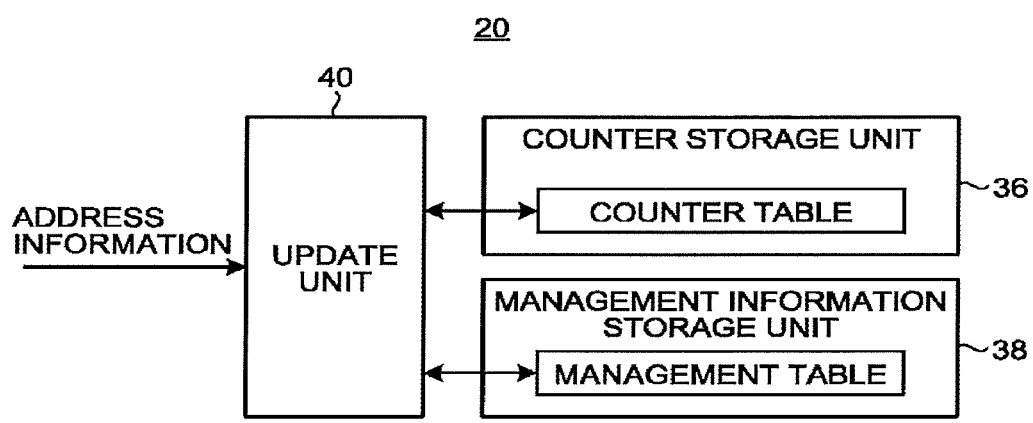
FIG. 5 is a diagram illustrating a configuration of a management device according to the first embodiment.
FIG. 6 is a diagram illustrating an example of a counter table according to the first embodiment.

FIG. 5 is a diagram illustrating a configuration of the management device 20 according to the first embodiment. The management device 20 includes a counter storage unit 36, a management information storage unit 38, and an update unit 40.

The counter storage unit 36 stores a counter table. The counter table stores therein a counter value representing the number of data rewrites for each of a plurality of first areas included in the nonvolatile memory 14. The counter table will be described further with reference to FIG. 6.

The management information storage unit 38 stores therein a management table. The management table has a predetermined number of entries. Each of the entries can store management information. That is, the management table is capable of storing the management information about each of a predetermined number of first areas. The number of pieces of management information capable of being stored in the management table is smaller than the number of first areas included in the nonvolatile memory 14. The management table stores management information about first areas (active first areas) of the nonvolatile memory 14 which the processing circuit 12 has recently accessed. When all the entries of the management table are filled, for example, the oldest management information (management information with the longest elapsed time from the access) is erased, and new management information is stored.

The management information indicates whether each of a plurality of second areas included in a corresponding first area has data written therein. For example, in the management information, when no data is stored in the corresponding first area, the states of all of the plurality of second areas included in the corresponding first area are each changed to an unwritten state. In the management information, when data is written into any one of the second areas of the corresponding first area without stored data, the state of the second area is set to a written state, and the states of the other write areas are set to the unwritten state. Note that the management table and the management information will be further described with reference to FIG. 7.

The update unit 40 updates each counter value stored in the counter table, and each piece of management information stored in the management table. When the processing circuit 12 writes data into the nonvolatile memory 14, the update unit 40 acquires address information of the written data, and updates a counter value and address information on the basis of the acquired address information. A specific process of the update unit 40 will be further described with reference to FIGS. 8 and 9.

FIG. 6 is a diagram illustrating an example of the counter table according to the first embodiment. The counter table stores a counter value corresponding to each of pieces of identification information (e.g., page number) for identifying each of a plurality of first areas (pages) included in the nonvolatile memory 14.

Each counter value represents an estimation value of the number of rewrites in a corresponding first area. Each counter value is set, for example, to 0 initially at the factory before shipment. Each counter value is incremented by 1 at a time by the update unit 40.

The access control device 18, the operating system, or the like refers to the counter values stored in the counter table to execute wear leveling control so that all the pages have an average counter value.

FIG. 7 is a diagram illustrating an example of the management table according to the first embodiment. The management table has a predetermined number of entries for storing management information. For example, in the example of FIG. 7, the management table has 64 entries.

Each entry stores management information. The management information includes the identification information and map information.

The identification information represents a number (page number) for identifying a first area (page) managed by the management information. The update unit 40 refers to the identification information, thereby determining which first area the management information of the entry manages.

The map information indicates whether or not each of a plurality of second areas (cache lines) included in a corresponding first area (page) has data written therein. The map information includes bits respectively corresponding to the plurality of second areas (cache lines) included in a first area (page).

For example, the map information includes a bit corresponding to a cache line number. For example, when 64 cache lines are included in one page, the map information includes 64 bits. For example, when a bit is 1, it indicates that a corresponding cache line has data written therein (i.e., a written state). For example, when a bit is 0, it indicates that a corresponding cache line has no data (i.e., an unwritten state).

In the management table, the management information may not be stored in all entries. In other words, the management table may have an unused entry.

Figure 8:
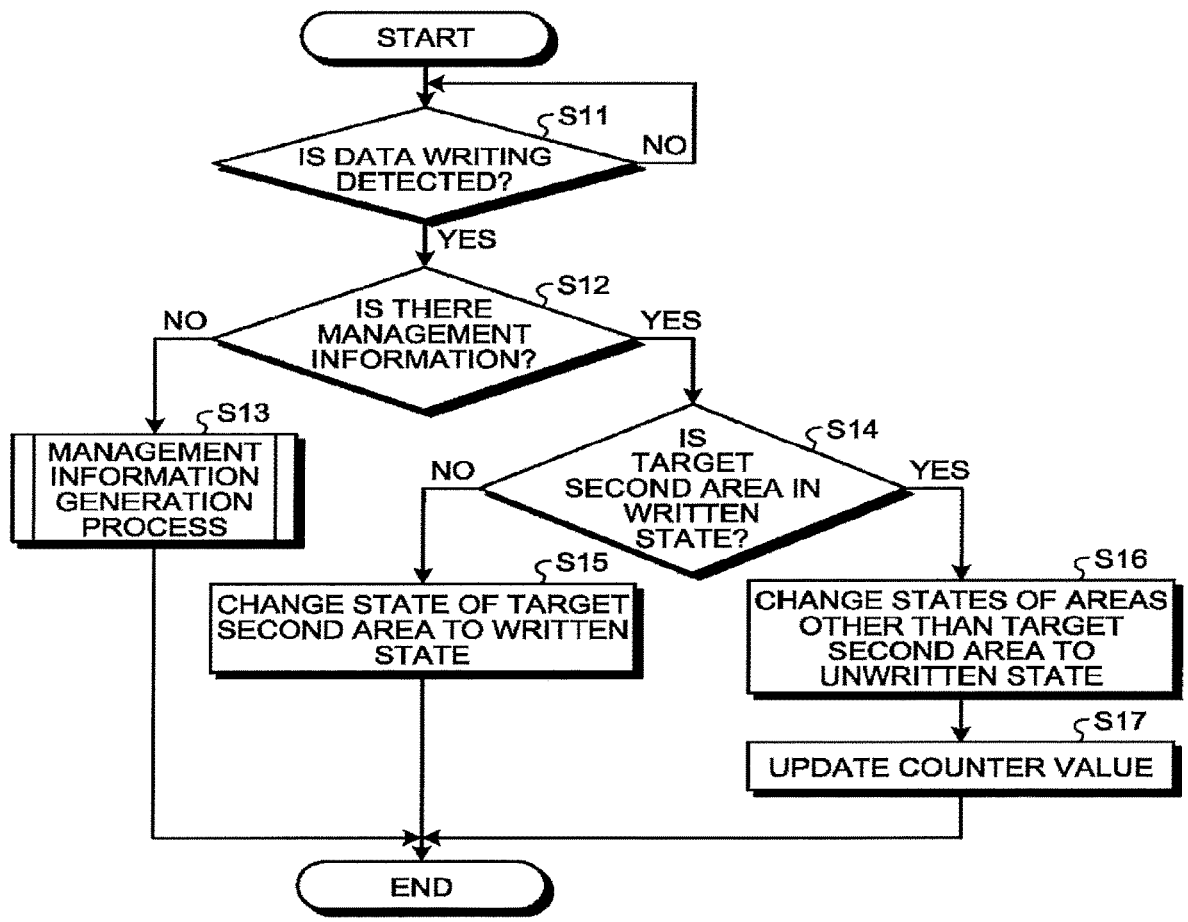
FIG. 8 is a flowchart illustrating a process performed by an update unit according to the first embodiment.

FIG. 8 is a flowchart illustrating a process performed by the update unit 40 according to the first embodiment. The update unit 40 updates the counter table and the management table, according to the flowcharts illustrated in FIGS. 8 and 9.

First, in S11, the update unit 40 detects whether data is to be written into the nonvolatile memory 14. When data is not to be written (No in S11), the update unit 40 stands by at S11, and when data is to be written (Yes in S11), the update unit 40 proceeds to S12.

In S12, the update unit 40 determines whether there is management information about a target first area in the management table. The target first area is a first area to which data to be written (first data) is written. For example, the update unit 40 determines whether the management table stores management information including a page number the same as a page number included in address information.

When there is no management information about a target first area in the management table, for example, when management information including a page number the same as a page number included in the address information is not stored in the management table (No in S12), the update unit 40 proceeds to S13. In S13, the update unit 40 performs a management information generation process. The management information generation process will be described with reference to FIG. 9. Upon completion of the management information generation process, the update unit 40 ends this process and waits for next writing.

When there is management information about a target first area in the management table, for example, when management information including a page number the same as a page number included in the address information is stored in the management table (Yes in S12), the update unit 40 proceeds to S14.

In S14, the update unit 40 determines whether a state of a target second area indicated in the management information about a target first area is a written state. The target second area is a second area into which the first data is to be written. For example, the update unit 40 refers to the map information in the management information corresponding to the page number included in the address information, and determines whether a bit corresponding to a cache line number included in the address information is 1.

When the target second area is in the unwritten state, for example, when the bit corresponding to the cache line number included in the address information is 0 (No in S14), the update unit 40 proceeds to S15. In S15, the update unit 40 changes a state of the target second area indicated in the management information about a target first area, from the unwritten state to the written state. For example, the update unit 40 changes the corresponding bit from 0 to 1. Therefore, the update unit 40 can reflect a state of the nonvolatile memory 14 to which the first data has been written, in the management table. Upon completion of S15, the update unit 40 ends this process and waits for next writing.

When the target second area indicated in the management information about a target first area is in the written state, for example, when the bit corresponding to the cache line number included in the address information is 1 (Yes in S14), the update unit 40 proceeds to S16. In S16, the update unit 40 changes states of second areas other than the target second area indicated in the management information about a target first area, to the unwritten state. That is, the update unit 40 sets only the target second area indicated in the management information about a target first area, to the written state, and sets the other second areas to the unwritten state. For example, the update unit 40 sets only the corresponding bit to 1, and sets the other bits to 0.

Therefore, the update unit 40 can reflect the state of the nonvolatile memory 14 in which the first data has been written into the target second area, in the management table.

Upon completion of S16, the update unit 40 proceeds to S17. In S17, the update unit 40 updates a counter value for the target first area. For example, the update unit 40 increments by 1 a counter value in the counter table, corresponding to the page number included in the address information. Therefore, the update unit 40 can update the number of rewrites in the target first area.

Note that the update unit 40 may reverse S16 and S17. Upon completion of S16 and S17, the update unit 40 ends this process and waits for next writing.

Figure 9:
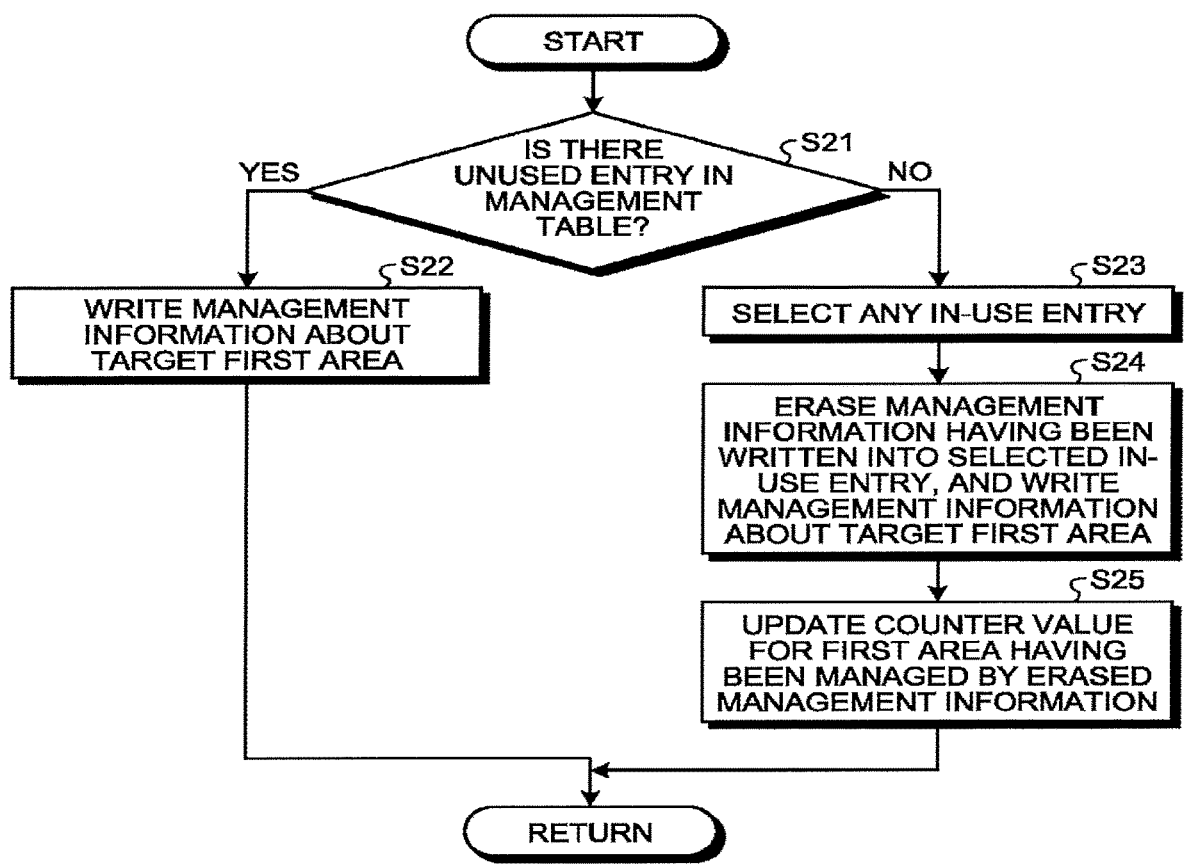
FIG. 9 is a flowchart illustrating a management information generation process according to the first embodiment.

FIG. 9 is a flowchart illustrating the management information generation process performed by an update unit 40 according to the first embodiment. In the management information generation process illustrated in S13 of FIG. 8, the update unit 40 performs the process from S21 to S25 illustrated in FIG. 9.

First, in S21, the update unit 40 determines whether there is an unused entry in the management table. That is, the update unit 40 determines whether there is an entry in which management information is not stored, in the management table.

When there is an unused entry (Yes in S21), the update unit 40 proceeds to S22. In S22, the update unit 40 writes the management information about a target first area, to the unused entry. That is, the update unit 40 writes the management information including identification information for identifying the target first area, and map information in which only the target second area is set to the written state and the other areas are set to the unwritten state, to the unused entry. For example, the update unit 40 writes the page number included in the address information, and the map information in which only a bit corresponding to the cache line number included in the address information is set to 1, and the other bits are set to 0, to the unused entry.

Therefore, the update unit 40 can reflect the state of the nonvolatile memory 14 to which the first data has been written, in the management table. Upon completion of S22, the update unit 40 returns to the process of FIG. 8.

When there is no unused entry (No in S21), the update unit 40 proceeds to S23. In S23, the update unit 40 selects any in-use entry from the management table. For example, the update unit 40 selects an in-use entry storing the oldest management information. Note that the update unit 40 may select any in-use entry according to another algorithm.

Upon completion of S23, the update unit 40 proceeds to S24. In S24, the update unit 40 erases the management information having been written into the selected in-use entry, and writes management information about a target first area. That is, the update unit 40 overwrites the selected in-use entry with the management information including the identification information for identifying the target first area, and the map information in which only the target second area is set to the written state and the other areas are set to the unwritten state. For example, the update unit 40 overwrites the selected in-use entry with a page number included in the address information, and map information in which only a bit corresponding to the cache line number included in the address information is set to 1, and the other bits are set to 0.

Therefore, the update unit 40 can erase the selected management information (e.g., the oldest management information) from the management table, and store new management information in the management table. Then, the update unit 40 can reflect the state of the nonvolatile memory 14 into which the first data has been written, in the management table.

Upon completion of S24, the update unit 40 proceeds to S25. In S25, the update unit 40 updates a counter value of a first area having been managed by the management information erased from the management table. For example, the update unit 40 increments by 1 a counter value in the counter table, corresponding to a page number included in the management information to be erased.

Through the process of S25, the update unit 40 can update the number of rewrites, assuming that data has been rewritten into the first area where management using the management table has been completed. Therefore, the update unit 40 can estimate the number of rewrites for the first area not actively managed by the management table.

Note that the update unit 40 may reverse S24 and S25. Upon completion of S24 and S25, the update unit 40 returns to the process of FIG. 8.

As described above, the information processing device 10 according to the present embodiment stores a smaller number of pieces management information than the number of the first areas included in the nonvolatile memory 14. Thus, according to the information processing device 10 of the present embodiment, the number of entries in the management table can be reduced, so that the storage capacity of the management information storage unit 38 can be reduced.

Furthermore, the information processing device 10 according to the present embodiment updates counter values of first areas not managed by the management table, at appropriate time when the management information is erased from the management table. Thus, according to the information processing device 10 of the present embodiment, the number of rewrites for all the first areas included in the nonvolatile memory 14 can be accurately estimated.

Second Embodiment

Next, an information processing device 10 according to the second embodiment will be described. Since the information processing device 10 according to the second embodiment has almost the same functions and configurations as those of the first embodiment, and blocks having the same functions and configurations are denoted by the same reference signs, and detailed description thereof will be omitted.

Figure 10:
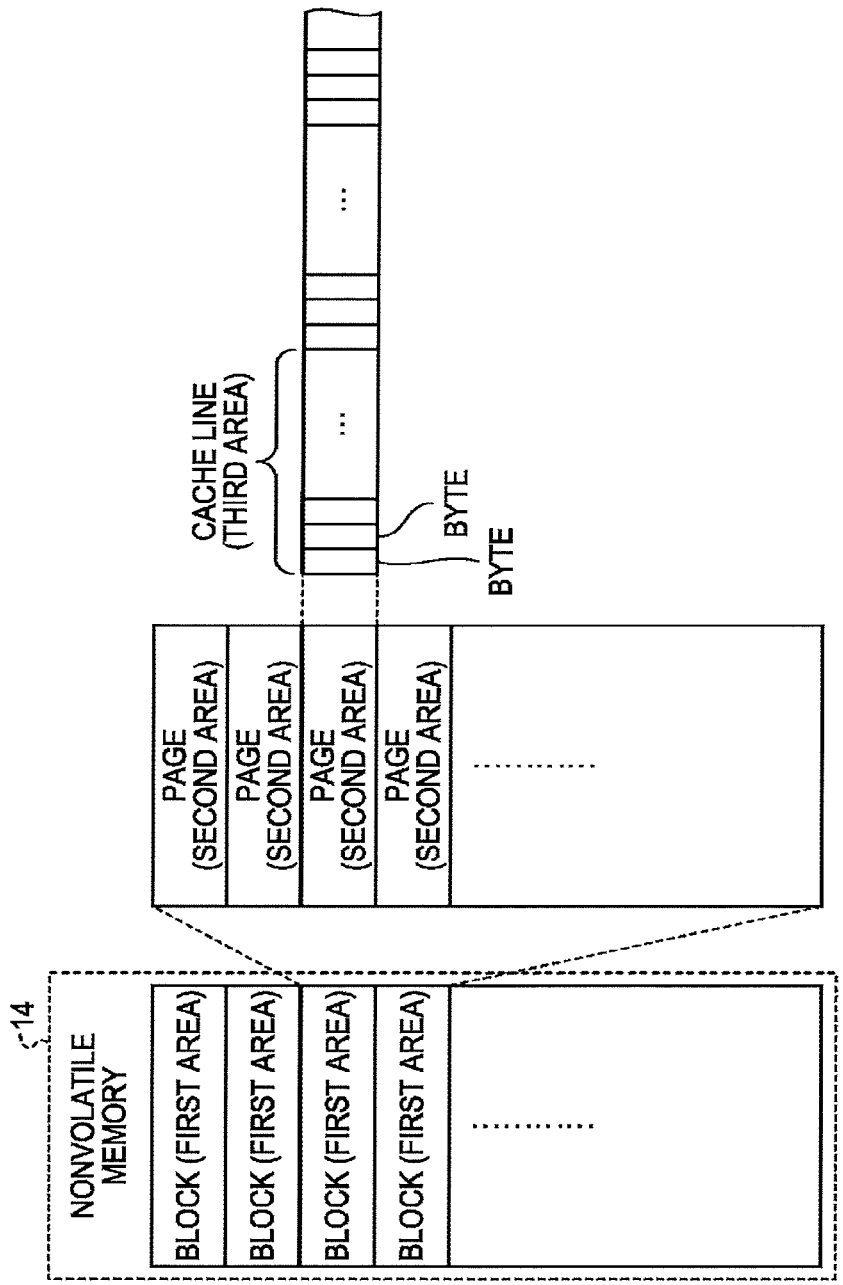
FIG. 10 is a diagram illustrating a configuration of a nonvolatile memory according to a second embodiment.

FIG. 10 is a diagram illustrating a configuration of a nonvolatile memory 14 according to a second embodiment. The nonvolatile memory 14 according to the second embodiment includes a plurality of first areas. In the second embodiment, each of the plurality of first areas has a unit called a block. The block may be, for example, 1 Mbyte.

Each of the plurality of first areas includes a plurality of second areas. In the second embodiment, each of the plurality of second areas has a unit called a page. The page is, for example, 4K bytes.

Each of the plurality of second areas includes a plurality of third areas. In the second embodiment, each of the plurality of third areas has a unit called a cache line. The cache line is, for example, 64 bytes. Note that the third area may have a unit smaller than the cache line (e.g., byte unit).

Figure 11:
FIG. 11 is a diagram illustrating an example of address information according to the second embodiment.

FIG. 11 is a diagram illustrating an example of address information for specifying a destination to which data is written into a nonvolatile memory 14 according to the second embodiment. In the second embodiment, the management device 20 acquires address information divided into four bit fields as illustrated in FIG. 11, from an access control device 18.

The most significant bit field of the address information indicates a position of a block (target first area) to which data is written. The second highest-order bit field of the address information indicates a position of a page (target second area) to which data is written in the target first area. The third highest-order bit field of the address information indicates a position of a cache line (target third area) to which data is written in the target second area. The fourth highest-order bit field of the address information indicates a position of a byte to which data is written in the target third area.

Therefore, acquisition of a value of a specific bit field in the obtained address information, enables the management device 20 to specify a block (target first area), a page (target second area), and a cache line (target third area) to which data is to be written.

Figure 12:
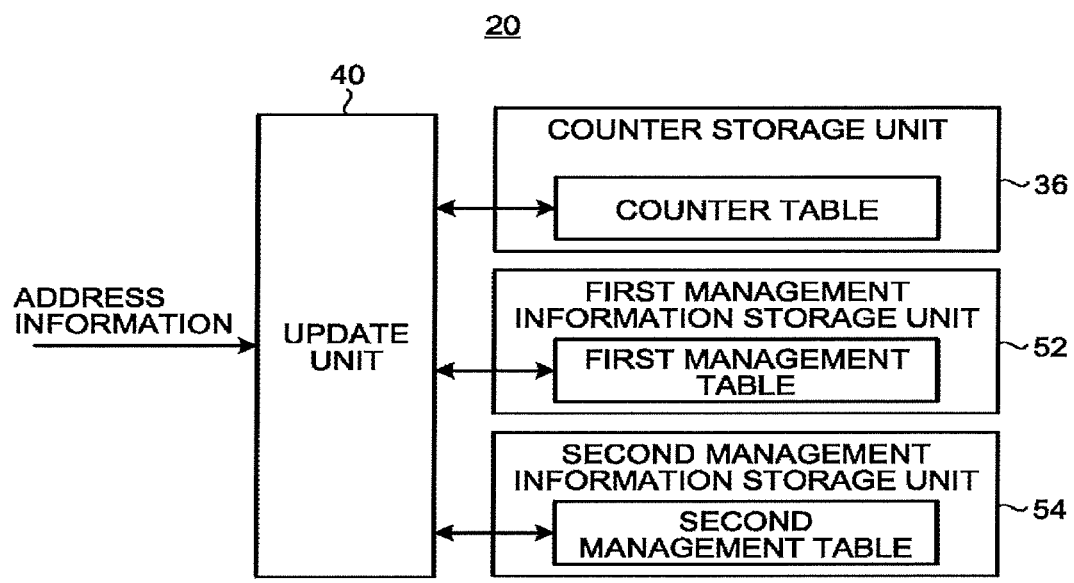
FIG. 12 is a diagram illustrating a functional configuration of a management device according to the second embodiment.

FIG. 12 is a diagram illustrating a functional configuration of the management device 20 according to the second embodiment. The management device 20 includes a counter storage unit 36, a first management information storage unit 52, a second management information storage unit 54, and an update unit 40.

The counter storage unit 36 stores a counter table. The counter table will be further described with reference to FIG. 13.

The first management information storage unit 52 stores therein a first management table. The first management table has a predetermined number of entries. Each of the entries can store first management information. That is, the first management table is capable of storing the first management information about each of a predetermined number of first areas. The number of pieces of first management information stored in the first management table is smaller than the number of first areas included in the nonvolatile memory 14. The first management table stores first management information about a first area (active first area) of the nonvolatile memory 14 which the processing circuit 12 has recently accessed. When all the entries of the first management table are filled, for example, the oldest first management information (management information with the longest elapsed time from the access) is erased, and new first management information is stored.

The first management information indicates whether each of the plurality of second areas included in a corresponding first area has data written therein. Note that the first management table and the first management information will be described further with reference to FIG. 14.

The second management information storage unit 54 stores therein a second management table. The second management table has a predetermined number of entries. Each of the entries can store second management information. That is, the second management table is capable of storing the second management information about each of a predetermined number of second areas. The number of pieces of second management information stored in the second management table is smaller than the number of second areas included in the nonvolatile memory 14. The second management table stores second management information about a second area (active second area) which the processing circuit 12 has recently accessed. When all the entries of the second management table is filled, for example, the oldest second management information (management information with the longest elapsed time from the access) is erased, and new second management information is stored.

The second management information indicates whether each of the plurality of third areas included in a corresponding second area has data written therein. Note that the second management table and the second management information will be described further with reference to FIG. 15.

The update unit 40 updates each counter value stored in the counter table, each piece of the first management information stored in the first management table, and each piece of the second management information stored in the second management table. A specific process of the update unit 40 will be described further with reference to FIGS. 16 to 19.

FIG. 13 is a diagram illustrating an example of the counter table according to the second embodiment. The counter table stores a counter value corresponding to each piece of first identification information (e.g., block number) for identifying a plurality of first areas (blocks) included in the nonvolatile memory 14.

FIG. 14 is a diagram illustrating an example of the first management table according to the second embodiment.

The first management table has a predetermined number of entries for storing first management information. For example, in the example of FIG. 14, the first management table has 64 entries.

Each of the entries stores first management information. The first management information includes the first identification information and first map information.

The first identification information represents a number (block number) for identifying a first area (block) managed by the first management information. The first map information indicates whether each of a plurality of second areas (pages) included in a corresponding first area (block) has data written therein. The first map information includes a bit corresponding to each of the plurality of second areas (pages) included in a first area (block).

For example, the first map information includes a bit corresponding to a page number included in a block. For example, when a bit is 1, it indicates that a corresponding page has data written therein (i.e., a written state). For example, when a bit is 0, it indicates that a corresponding page has no data (i.e., a unwritten state).

In the first management table, the first management information may not be stored in all entries. In other words, the first management table may have an unused entry.

FIG. 15 is a diagram illustrating an example of the second management table according to the second embodiment. The second management table has a predetermined number of entries for storing second management information. For example, in the example of FIG. 15, the second management table has 64 entries.

Each entry stores second management information. The second management information includes second identification information and second map information.

The second identification information represents a number (block number and page number) for identifying a second area (page) managed by the second management information and a first area (block) including the second area. The second map information indicates whether each of a plurality of third areas (cache lines) included in a corresponding second area (page) has data written therein. The second map information includes a bit corresponding to each of the plurality of third areas (cache lines) included in a second area (page).

For example, the second map information includes a bit corresponding to a cache line number included in a page. For example, when a bit is 1, it indicates that a corresponding cache line has data written therein (i.e., a written state). In addition, for example, when a bit is 0, it indicates that a corresponding cache line has no data (i.e., an unwritten state).

In the second management table, the second management information may not be stored in all entries. In other words, the second management table may have an unused entry.

Figure 16:
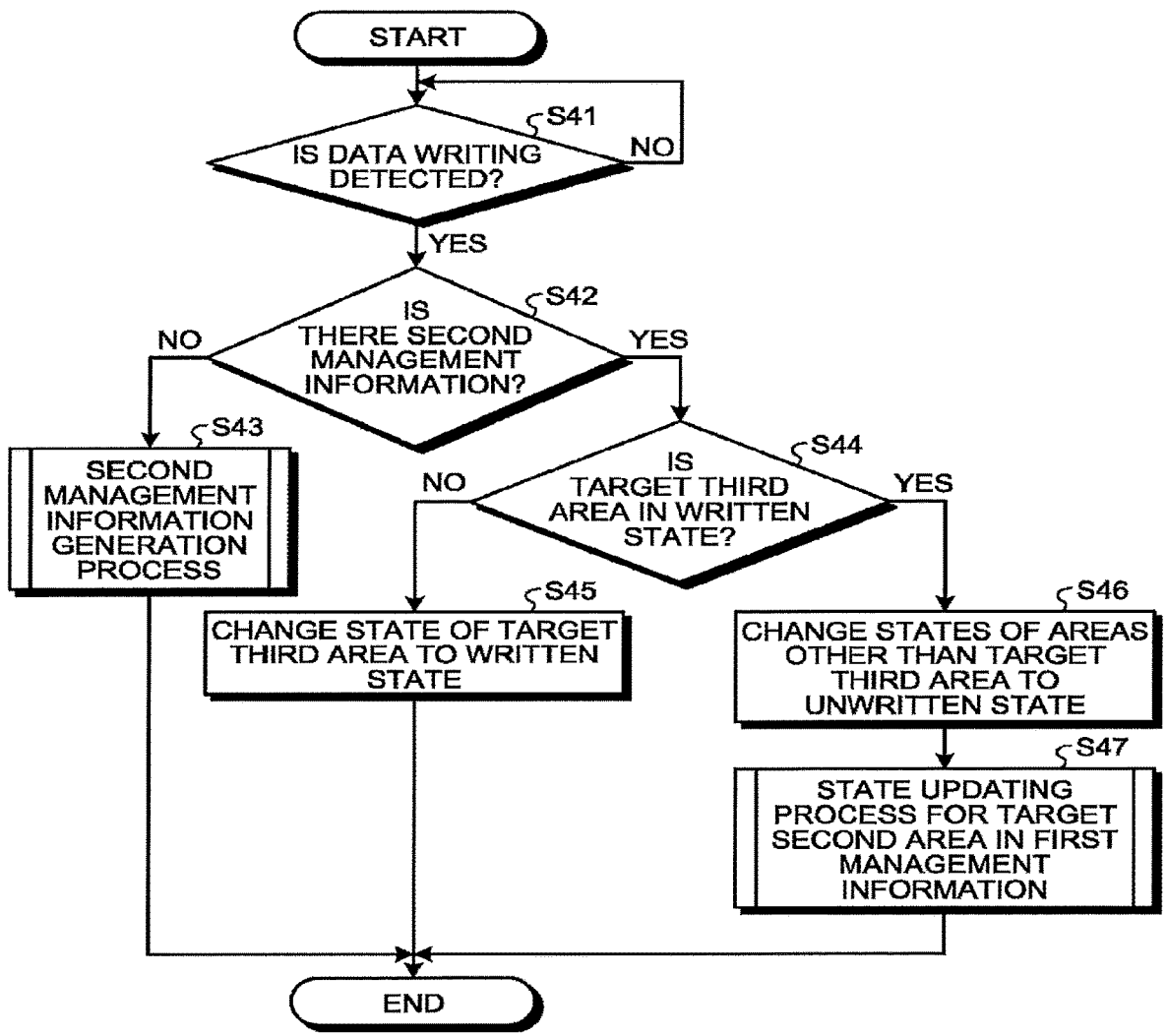
FIG. 16 is a flowchart illustrating a process performed by an update unit according to the second embodiment.

FIG. 16 is a flowchart illustrating a process performed by the update unit 40 according to the second embodiment. The update unit 40 updates the counter table, the first management table, and the second management table, according to the flowcharts illustrated in FIGS. 16 to 19.

First, in S41, the update unit 40 detects whether data is to be written into the nonvolatile memory 14. When data is not written (No in S41), the update unit 40 stands by at S41, and when data is to be written (Yes in S41), the update unit 40 proceeds to S42.

In S42, the update unit 40 determines whether there is second management information about a target second area in the second management table. The target second area is a second area to which data to be written (first data) is written.

When there is no second management information about the target second area in the second management table (No in S42), the update unit 40 proceeds to S43. In S43, the update unit 40 performs a second management information generation process. The second management information generation process will be described with reference to FIG. 17. Upon completion of the second management information generation process, the update unit 40 ends this process and waits for next writing.

When there is second management information about a target second area in the second management table (Yes in S42), the update unit 40 proceeds to S44. In S44, the update unit 40 refers to the second management information about a target second area to determine whether a target third area as a third area to which first data is to be written is in a written state.

When the target third area is in an unwritten state (No in S44), the update unit 40 proceeds to S45. In S45, the update unit 40 changes a state of the target third area indicated in the second management information about a target second area, from an unwritten state to a written state. Therefore, the update unit 40 can reflect the state of the nonvolatile memory 14 to which the first data has been written, in the second management table. Upon completion of S45, the update unit 40 ends this process and waits for next writing.

When the target third area is in a written state (Yes in S44), the update unit 40 proceeds to S46. In S46, the update unit 40 changes states of areas other than the target third area indicated in the second management information about a target second area, to the unwritten state. That is, the update unit 40 sets to the written state only the target third area indicated in the second management information about a target second area, and sets the other areas to the unwritten state.

Therefore, the update unit 40 can reflect the state of the nonvolatile memory 14 in which the first data has been written into the target third area, in the second management table.

Upon completion of S46, the update unit 40 proceeds to S47. In S47, the update unit 40 performs a state updating process for updating the state of the target second area indicated by first management information about a first area including the target second area. The state updating process for updating the state of the target second area will be described further with reference to FIG. 18. Therefore, the update unit 40 can reflect a state of the nonvolatile memory 14 to which the data has been additionally written into the target second area, in the first management table.

Note that the update unit 40 may reverse S46 and S47. Upon completion of S46 and S47, the update unit 40 ends this process and waits for next writing.

Figure 17:
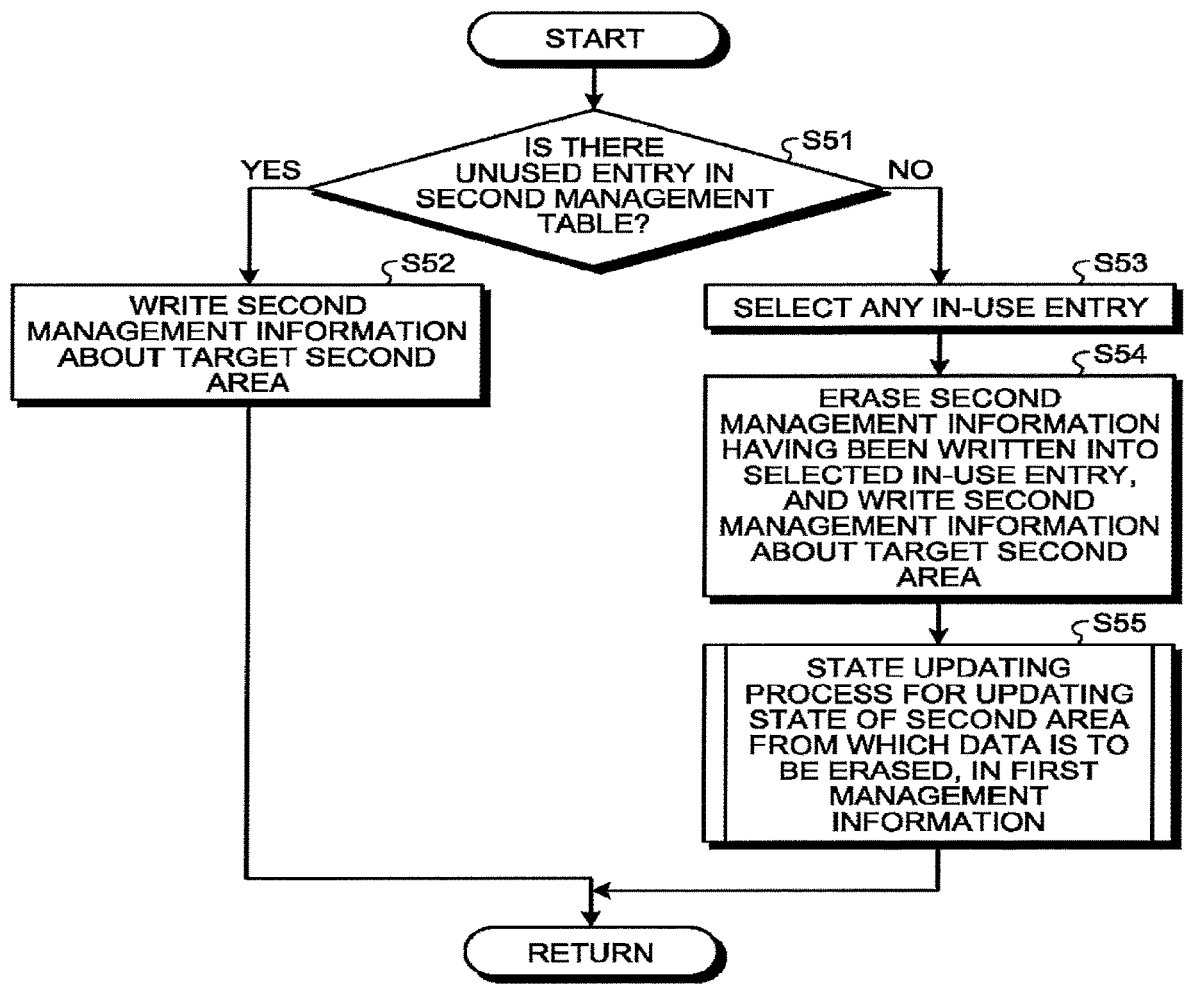
FIG. 17 is a flowchart illustrating a second management information generation process according to the second embodiment.

FIG. 17 is a flowchart illustrating the second management information generation process performed by the update unit 40 according to the second embodiment. In the second management information generation process illustrated in S43 of FIG. 16, the update unit 40 performs the process from S51 to S55 illustrated in FIG. 17.

First, in S51, the update unit 40 determines whether there is an unused entry in the second management table.

When there is an unused entry (Yes in S51), the update unit 40 proceeds to S52. In S52, the update unit 40 writes the second management information about a target second area, to the unused entry. That is, the update unit 40 writes the second management information including second identification information for identifying the target second area and including second map information representing that only the target third area is set to the written state and the other areas are set to the unwritten state, to the unused entry.

Therefore, the update unit 40 can reflect the state of the nonvolatile memory 14 into which the first data has been written, in the second management table. Upon completion of S52, the update unit 40 returns to the process of FIG. 16.

When there is no unused entry (No in S51), the update unit 40 proceeds to S53. In S53, the update unit 40 selects any in-use entry from the second management table. For example, the update unit 40 selects an in-use entry storing the oldest second management information. Note that the update unit 40 may select any in-use entry according to another algorithm.

Upon completion of S53, the update unit 40 proceeds to S54. In S54, the update unit 40 erases the second management information having been written into the selected in-use entry, and writes second management information about a target second area. That is, the update unit 40 overwrites the selected in-use entry with the second management information including the second identification information for identifying the target second area and including the second map information representing that only the target third area is set to the written state and the other areas are set to the unwritten state.

Therefore, the update unit 40 can erase the selected second management information from the second management table, and store new second management information in the second management table. Then, the update unit 40 can reflect the state of the nonvolatile memory 14 to which the first data has been written, in the second management table.

Upon completion of S54, the update unit 40 proceeds to S55. In S55, the update unit 40 performs a state updating process for updating the state of a second area from which data is to be erased, in the first management information about a first area including the second area from which data is to be erased. The second area from which data is to be erased is a second area having been managed by the second management information to be erased in S54. The state updating process for updating the state of the second area from which data is to be erased will be described further with reference to FIG. 18.

Through the process of S55, the update unit 40 can update a state indicating whether writing is performed, assuming that data is rewritten to the second area where management using the second management table has been completed. Therefore, the update unit 40 can estimate whether data is written into the second area not actively managed by the second management table.

Note that the update unit 40 may reverse S54 and S55. Upon completion of S54 and S55, the update unit 40 returns to the process of FIG. 16.

Figure 18:
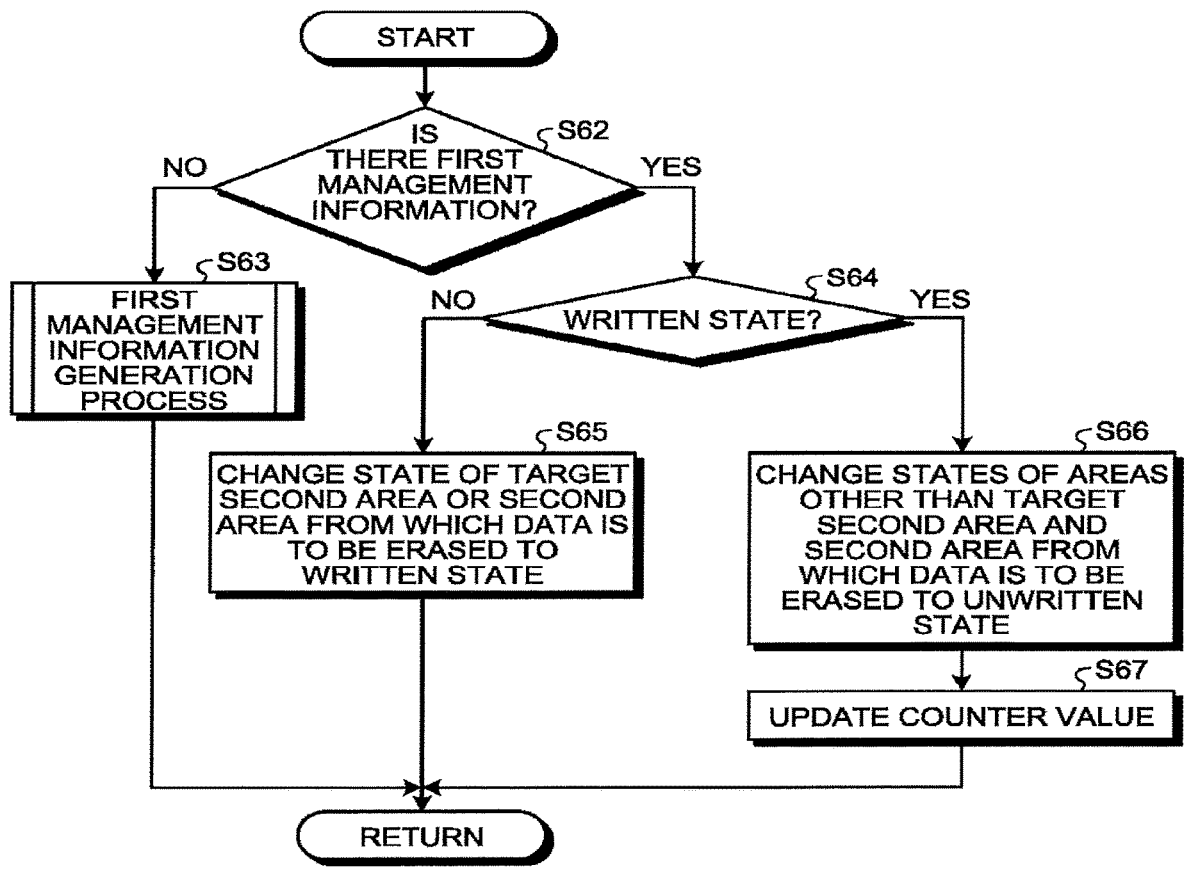
FIG. 18 is a flowchart illustrating a state updating process according to the second embodiment.

FIG. 18 is a flowchart illustrating the state updating process performed by the update unit 40 according to the second embodiment. In the state updating process in S47 of FIG. 16 and in S55 of FIG. 17, the update unit 40 executes the process from S62 to S67 illustrated in FIG. 18.

In S62, the update unit 40 determines whether there is the first management information about a first area (first area to be updated) including the target second area or a second area from which data is to be erased, in the first management table.

When there is no first management information about a first area to be updated (No in S62), the update unit 40 proceeds to S63. In S63, the update unit 40 performs a first management information generation process. The first management information generation process will be described with reference to FIG. 19. Upon completion of the first management information generation process, the update unit 40 ends this process and returns to the process of FIG. 16 or FIG. 17.

When there is first management information about a first area to be updated (Yes in S62), the update unit 40 proceeds to S64.

In S64, the update unit 40 determines whether the target second area or the second area from which data is to be erased, indicated in the first management information about a target first area to be updated, is in a written state.

When the target second area or the second area from which data is to be erased is in an unwritten state (No in S64), the update unit 40 proceeds to S65. In S65, the update unit 40 changes the state of the target second area or the second area from which data is to be erased, which is indicated in the first management information about a first area to be updated, from the unwritten state to the written state.

Therefore, the update unit 40 can reflect the state of the nonvolatile memory 14 to which the first data has been written, in the first management table. Alternatively, the update unit 40 can reflect an estimated state of the nonvolatile memory 14 in a case where it is assumed that data is written into the second area from which data is to be erased, in the first management table. Upon completion of S65, the update unit 40 ends this process and returns to the process of FIG. 16 or 17.

When the state of the target second area or the second area from which data is to be erased is in a written state (Yes in S64), the update unit 40 proceeds to S66. In S66, the update unit 40 changes states of areas other than the target second area and the second area from which data is to be erased, in the first management information about a first area to be updated, to the unwritten state. That is, the update unit 40 sets to the written state only the target second area or the second area from which data is to be erased, in the first management information about a first area to be updated, and sets the other areas to the unwritten state.

Therefore, the update unit 40 can reflect the state of the nonvolatile memory 14 in which the first data has been written into the target second area, in the first management table. Alternatively, the update unit 40 can reflect the estimated state of the nonvolatile memory 14 in a case where it is assumed that data has been written into the second area from which data is to be erased, in the first management table.

Upon completion of S66, the update unit 40 proceeds to S67. In S67, the update unit 40 updates a counter value of the first area to be updated. For example, the update unit 40 increments by 1 the counter value of the first area to be updated, in the counter table. Therefore, the update unit 40 can update the number of rewrites in the first area to be updated.

Note that the update unit 40 may reverse S66 and S67. Upon completion of S66 and S67, the update unit 40 ends this process and returns to the process of FIG. 16 or FIG. 17.

Figure 19:
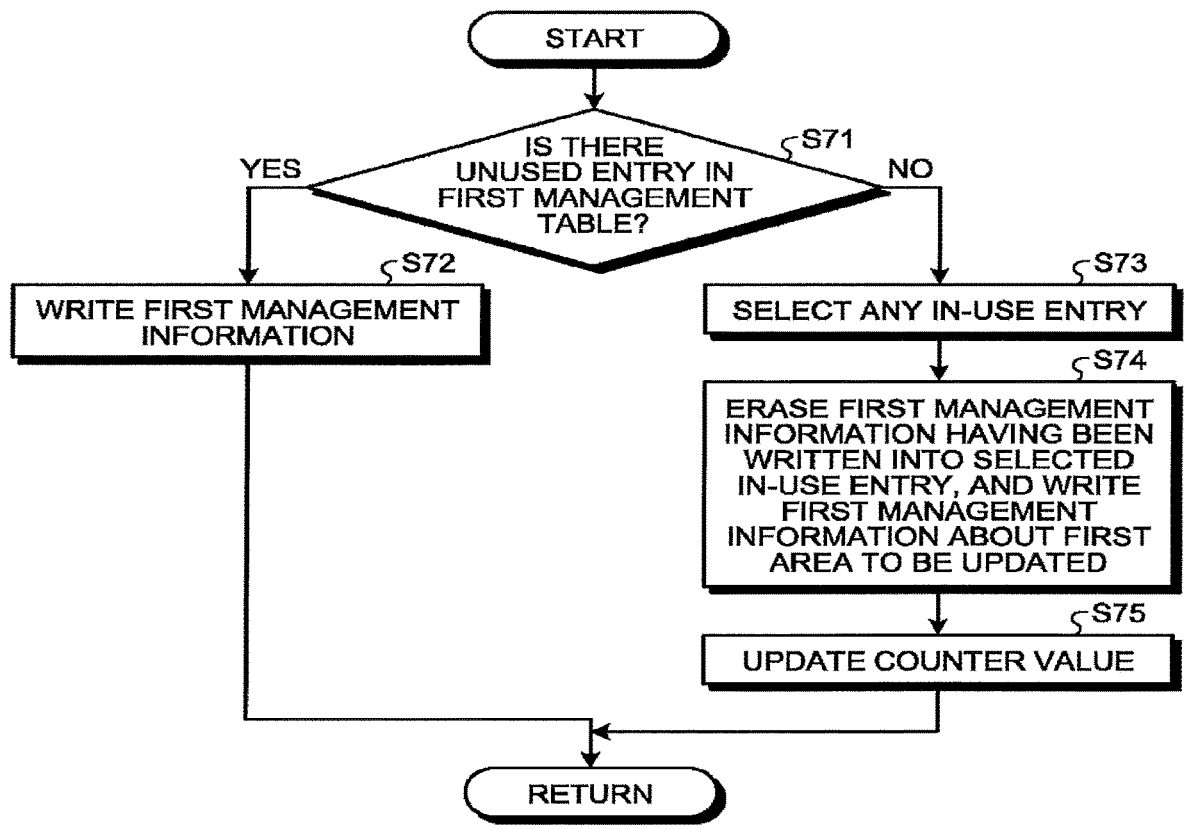
FIG. 19 is a flowchart illustrating a first management information generation process according to the second embodiment.

FIG. 19 is a flowchart illustrating the first management information generation process performed by the update unit 40 according to the second embodiment. In the first management information generation process illustrated in S63 of FIG. 18, the update unit 40 performs a process from S71 to S75 illustrated in FIG. 19.

First, in S71, the update unit 40 determines whether there is an unused entry in the first management table.

When there is an unused entry (Yes in S71), the update unit 40 proceeds to S72. In S72, the update unit 40 writes the first management information about a first area to be updated, to the unused entry. That is, the update unit 40 writes the first management information including first identification information for identifying the first area to be updated and including first map information representing that only the target second area or the second area from which data is to be erased is set to the written state and the other areas are set to the unwritten state, to the unused entry.

Therefore, the update unit 40 can reflect the state of the nonvolatile memory 14 in which the first data has been written into the target third area, or a state where it is assumed that data is written into the second area from which data is to be erased, following completion of management of the second area from which data is to be erased, in the first management table. Upon completion of S72, the update unit 40 returns to the process of FIG. 18.

When there is no unused entry (No in S71), the update unit 40 proceeds to S73. In S73, the update unit 40 selects any in-use entry from the first management table. For example, the update unit 40 selects an in-use entry storing the oldest first management information. Note that the update unit 40 may select any in-use entry according to another algorithm.

Upon completion of S73, the update unit 40 proceeds to S74. In S74, the update unit 40 erases the first management information having been written into the selected in-use entry, and writes first management information about a first area to be updated. For example, the update unit 40 overwrites the selected in-use entry with the first management information including the first identification information for identifying the first area to be updated and including the first map information representing that only the target third area or the second area from which data is to be erased is set to the written state, and other areas are set to the unwritten state.

Therefore, the update unit 40 can erase the selected first management information from the first management table. Then, the update unit 40 can reflect the state of the nonvolatile memory 14 in which the first data has been written into the target third area, or the estimated state of the nonvolatile memory 14 in a case where it is assumed that data is written into the second area from which data is to be erased, in the first management table.

Upon completion of S74, the update unit 40 proceeds to S75. In S75, the update unit 40 updates the counter value of a first area having been managed by first management information to be erased. For example, the update unit 40 increments by 1 the counter value of a first area having been managed by the first management information to be erased.

The update unit 40 can update the number of rewrites, assuming that data is rewritten into the first area where management using the first management table has been completed, through the process of S75. Thus, the update unit 40 can estimate the number of rewrites for the first area not actively managed by the first management table.

Note that the update unit 40 may reverse S74 and S75. Upon completion of S74 and S75, the update unit 40 returns to the process of FIG. 18.

As described above, in the information processing device 10 according to the second embodiment, the nonvolatile memory 14 is divided into a tree structure by using two areas of different sizes, to manage the number of rewrites for each first area necessary for wear leveling. Thus, according to the information processing device 10, even when a third area (cache line) and a block have a large difference in data size, the number of rewrites can be managed efficiently.

Furthermore, the information processing device 10 may use not only two areas of different sizes but also three or more areas of different sizes to manage the number of rewrites for each first area necessary for wear leveling.

Modifications

Modifications of the first embodiment and the second embodiment will be described below.

Figure 20:
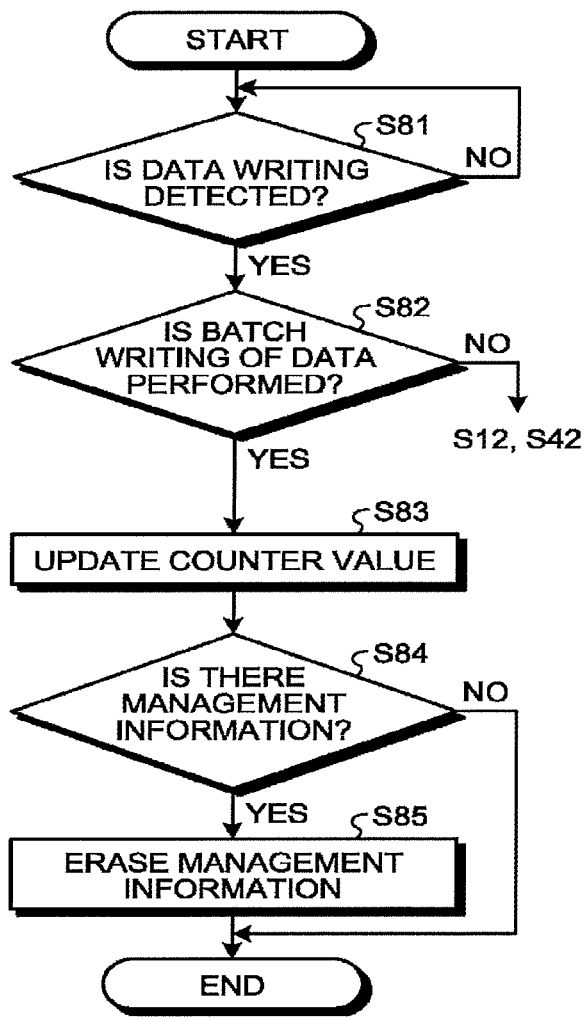
FIG. 20 is a flowchart illustrating a process performed by a management device, where batch writing is enabled.

FIG. 20 is a flowchart illustrating a process performed by a management device 20, in a case where batch writing of data is enabled in units of pages or the like. The processing circuit 12 may use direct memory access (DMA) or the like to perform batch writing of data in units of first areas (e.g., pages or blocks). When batch writing of data is enabled to the first area in this way, the management device 20 may perform a process according to a flowchart illustrated in FIG. 20.

First, in S81, the update unit 40 determines whether data is to be written into the nonvolatile memory 14. When data is not written (No in S81), the update unit 40 stands by at S81, and when data is to be written (Yes in S81), the update unit 40 proceeds to S82.

In S82, the update unit 40 determines whether batch writing of data is to be performed in units of first areas (e.g., page or block). When batch writing of data is not to be performed, that is, when data is to be written in units of third areas (cache lines) (No in S82), the update unit 40 proceeds to S12 of FIG. 8 or S42 of FIG. 16. Thereafter, the update unit 40 performs the process described in the first embodiment or the second embodiment.

When batch writing of data is to be performed, that is, when data is to be written in units of first areas (e.g., pages or blocks) (Yes in S82), the update unit 40 proceeds to S83.

In S83, the update unit 40 updates a counter value in the counter table, corresponding to a first area to which data is written. For example, the update unit 40 increments the corresponding counter value by 1. In this configuration, when data is continuously written into a plurality of first areas, the update unit 40 updates a corresponding counter value in synchronization with writing start timing or the like of each first area.

Next, in S84, the update unit 40 determines whether there is management information (or the first management information and the second management information) managing the first area (or the first area and the second area) to which the data has been written, in the management table (or the first management table and the second management table). When there is no corresponding management information (or the first management information and the second management information) (No in S84), the update unit 40 ends this process and waits for next writing.

When there is corresponding management information (or first management information and second management information) (Yes in S84), the update unit 40 proceeds to S85. In S85, the update unit 40 erases the corresponding management information (or the first management information and the second management information). Then, upon terminating S85, the update unit 40 ends this process and waits for next writing.

Through the above processing, when batch writing of data is performed in units of first areas (e.g., pages or blocks), the management device 20 can readily update the counter table and the management table.

Figures 21, 22:
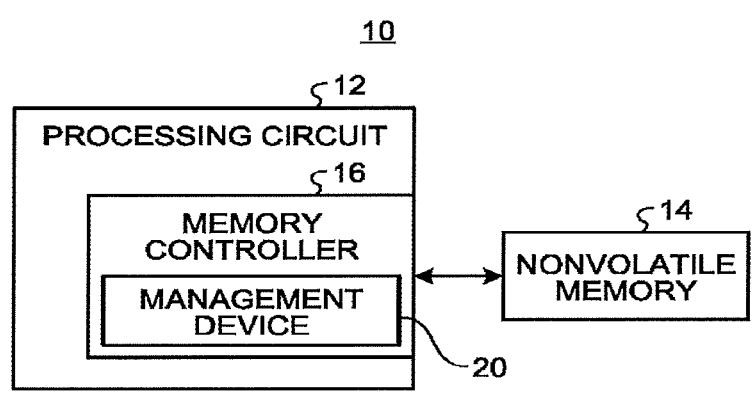
FIG. 21 is a diagram illustrating a modification of identification information.
FIG. 22 is a diagram illustrating a first modification of the configuration of the information processing device.

FIG. 21 is a diagram illustrating a modification of the identification information. In the first embodiment and the second embodiment, the management device 20 uses the page number to identify the management information. Instead, the management device 20 may store management information corresponding to an address managed by a translation lookaside buffer (TLB).

The processing circuit 12 has a virtual storage mechanism called TLB. The TLB stores correspondence relation information indicating correspondence between a logical address and a physical address on a page to perform conversion from a virtual address to a physical address. However, since the TLB holds a limited number of entries, pieces of the correspondence relation information are exchanged if necessary. For example, the TLB preferentially stores correspondence relation information about a page accessed frequently most recently.

Therefore, the management device 20 may store a page having correspondence relation information stored in the TLB, in a management table. For example, the management device 20 stores a management table (or second management table) having the same number of entries as the number of TLB entries. Then, at time when correspondence relation information is removed from a TLB entry, the update unit 40 erases corresponding management information (or second management information) stored in the management table (or second management table). In this configuration, the update unit 40 performs a process similar to that of overwriting the management information (or second management information) with other management information. Note that since the management table (or second management table) has the same entries as the TLB entries, the entries do not need to store identification information.

Such storage of management information in the management table enables the management device 20 to efficiently manage the number of rewrites for each first area, necessary for wear leveling, in synchronization with the processing circuit 12.

FIG. 22 is a diagram illustrating a first modification of the configuration of the information processing device 10. For example, the processing circuit 12 may internally include the memory controller 16 therein. In this configuration, the management device 20 is provided inside the processing circuit 12 together with the memory controller 16. In addition, the management device 20 may be provided separately from the memory controller 16, in the processing circuit 12.

Figure 23:
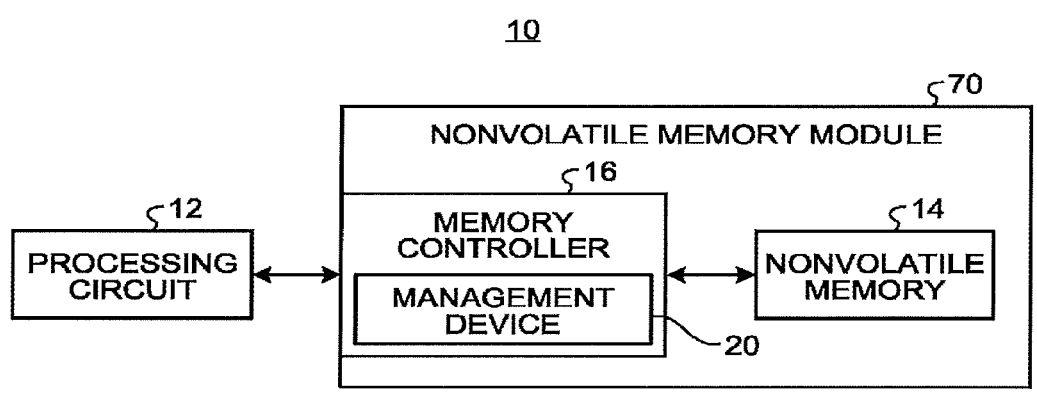
FIG. 23 is a diagram illustrating a second modification of the configuration of the information processing device.

FIG. 23 is a diagram illustrating a second modification of the configuration of the information processing device 10. Furthermore, for example, the information processing device 10 may include the processing circuit 12 and a nonvolatile memory module 70. In this configuration, the nonvolatile memory module 70 includes the nonvolatile memory 14 and the memory controller 16. In this configuration, the management device 20 is provided in the nonvolatile memory module 70 together with the memory controller 16. Note that the management device 20 may be provided separately from the memory controller 16 in the nonvolatile memory module 70.

Figure 24:
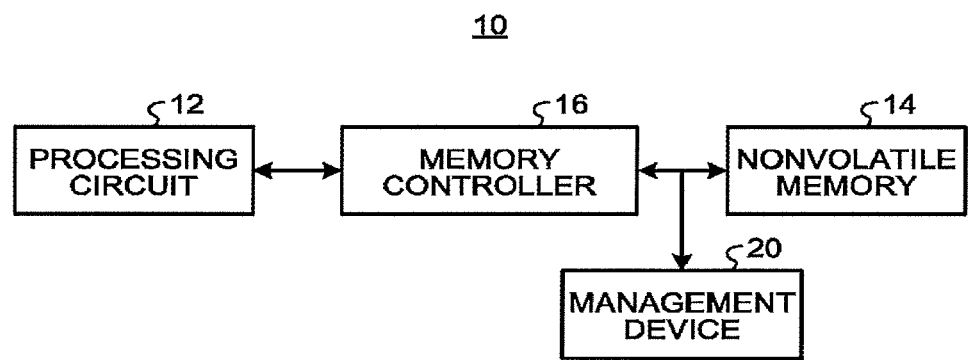
FIG. 24 is a diagram illustrating a third modification of the configuration of the information processing device.

FIG. 24 is a diagram illustrating a third modification of the configuration of the information processing device 10. Furthermore, for example, the information processing device 10 may further include the management device 20 separately from the processing circuit 12, the nonvolatile memory 14, and the memory controller 16. In this configuration, the management device 20 is implemented as a hardware device connected to acquire a write address to the nonvolatile memory 14.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device that manages a nonvolatile memory,
    the nonvolatile memory including a plurality of first areas,
    each of the plurality of first areas including a plurality of second areas,
    each of the plurality of second areas being a unit of rewriting data to the nonvolatile memory by a processing circuit,
    the management device comprising:
    a memory; and
    a hardware processor, wherein
    the memory is configured to store therein a counter value for each of the plurality of first areas, and
    the memory is configured to store therein a first management table capable of storing first management information about each of a predetermined number of first areas; and
    the hardware processor is configured to update the counter value and the first management table and perform wear leveling control on the nonvolatile memory on the basis of the counter value for each of the plurality of first areas, wherein
    the first management information indicates whether each of a plurality of second areas included in a corresponding first area has data written therein, and
    in response to writing of first data into the nonvolatile memory, the hardware processor is configured to:
        when a state of a target second area indicated in the first management information about a target first area is an unwritten state, change the state of the target second area to a written state, the target first area being the first area into which the first data is to be written, the target second area being the second area into which the first data is to be written, and
        when the state of the target second area indicated in the first management information is the written state, set all of the second areas other than the target second area indicated in the management information to the unwritten state, and update the counter value for the target first area.

2. The device according to claim 1, wherein
    the first management table is capable of storing the first management information about first areas smaller in number than the number of the plurality of first areas included in the nonvolatile memory.

3. The device according to claim 1, wherein
    when there is no first management information about the target first area in the first management table, the hardware processor is configured to perform a management information generation process, and
    in the management information generation process, the hardware processor is configured to:
    when there is an unused entry in the first management table, write the first management information about the target first area to the unused entry,
    when there is no unused entry in the first management table, erase the first management information having been written into any of in-use entries to write the first management information about the target first area, and update the counter value of a first area having been managed by the erased first management information.

4. The device according to claim 3, wherein
when there is no unused entry in the first management table, the hardware processor is configured to erase an oldest first management information.

5. The device according to claim 1, wherein
each of the plurality of first areas is a data unit managed by the processing circuit.

6. The device according to claim 5, wherein
the processing circuit includes a cache memory configured to temporarily store therein data read from the nonvolatile memory, and
each of the plurality of second areas has a size equal to that of a cache line of the cache memory.

7. The device according to claim 1, wherein
in the nonvolatile memory, batch writing of data in units of first areas or writing of data in units of second areas is performed, and
when the batch writing of data in units of first areas is performed, the hardware processor is configured to update the counter value of a first area to which data is written.

8. The device according to claim 1, wherein
the first management table stores therein the first management information about a first area managed by a virtual storage mechanism that stores correspondence relation information indicating a correspondence between a logical address and a physical address, and
when the correspondence relation information is removed by the virtual storage mechanism, the hardware processor is configured to erase the corresponding first management information stored in the first management table and update the counter value for the first area having been managed by the erased first management information.

9. The device according to claim 1, wherein
each of the plurality of second areas includes a plurality of third areas,
the memory is configured to further store therein a second management table capable of storing therein second management information about each of a predetermined number of second areas,
the second management information indicates whether each of a plurality of third areas included in a corresponding second area has data written therein, and
in response to writing of the first data to the nonvolatile memory, the hardware processor is configured to perform a state updating process in such a manner to:
  when a state of a target third area indicated in the second management information about the target second area is a unwritten state, change the state of the target third area to a written state, the target third area being the third area into which the first data is to be written, and
  when the state of the target third area indicated in the second management information is the written state, update the state of the target second area indicated in the first management information about the first area including the target second area.

10. The device according to claim 9, wherein
when there is no second management information about the target second area in the second management table, the hardware processor is configured to perform a second management information generation process, and
in the second management information generation process,
the hardware processor is configured to:
perform a state updating process in such a manner to
  when there is an unused entry in the second management table, write the second management information about the target second area to the unused entry,
  when there is no unused entry in the second management table, erase the second management information having been written into any of in-use entries to write the second management information about the target second area, and
  update a state of a second area from which data is to be erased indicated in the first management information about a first area including the second area from which data is to be erased, the erased second area being the second area having been managed by the second management information to be erased.

11. The device according to claim 10, wherein
in the state updating process, the hardware processor is configured to:
when the state of the target second area or the state of the second area from which data is to be erased, being indicated in the first management information about a first area to be updated including the target second area or the second area from which data, is an unwritten state, change the state of the target second area or the second area from which data is to be erased to a written state, and
when the state of the target second area or the second area from which data is to be erased, being indicated in the first management information about the first area to be updated, is the written state, update the counter value for the first area to be updated.

12. The device according to claim 11, wherein
when there is no first management information about the first area to be updated in the first management table, the hardware processor is configured to perform a first management information generation process, and
in the first management information generation process, the hardware processor is configured to:
  when there is an unused entry in the second management table, write the first management information about the first area to be updated into an unused entry,
  when there is no unused entry in the second management table, erase the second management information having been written into any of in-use entries to write the first management information about the target first area to be updated, and
update the counter value for a first area having been managed by the first management information to be erased.

13. An information processing device comprising:
a processing circuit;
a nonvolatile memory; and
a management device configured to manage the nonvolatile memory,
the nonvolatile memory including a plurality of first areas,
each of the plurality of first areas including a plurality of second areas,
each of the plurality of second areas being a unit of rewriting data to the nonvolatile memory by a processing circuit, the management device including:
a memory; and
a hardware processor, wherein
the memory is configured to store therein a counter value for each of the plurality of first areas, and
the memory is configured to store therein a first management table capable of storing first management information about each of a predetermined number of first areas; and
the hardware processor is configured to update the counter value and the first management table and perform wear leveling control on the nonvolatile memory on the basis of the counter value for each of the plurality of first areas, wherein
the first management information indicates whether each of a plurality of second areas included in a corresponding first area has data written therein, and
in response to writing of first data into the nonvolatile memory, the hardware processor is configured to:
when a state of a target second area indicated in the first management information about a target first area is an unwritten state, change the state of the target second area to a written state, the target first area being the first area into which the first data is to be written, the target second area being the second area into which the first data is to be written, and
    when the state of the target second area indicated in the first management information is the written state, set all of the second areas other than the target second area indicated in the management information to the unwritten state, and update the counter value for the target first area.

14. A management method performed in a management device that manages a nonvolatile memory,
the nonvolatile memory including a plurality of first areas, each of the plurality of first areas including a plurality of second areas,
each of the plurality of second areas being a unit of rewriting data to the nonvolatile memory by a processing circuit,
the management device including:
a memory, wherein
the memory is configured to store therein a counter value for each of the plurality of first areas, and
the memory is configured to store therein a first management table capable of storing first management information about each of a predetermined number of first areas,
the first management information indicating whether each of a plurality of second areas included in a corresponding first area has data written therein,
the method comprising:
updating the counter value and the first management table and performing wear leveling control on the nonvolatile memory on the basis of the counter value for each of the plurality of first areas,
according to writing of first data to the nonvolatile memory,
changing, when a state of a target second area indicated in the first management information about a target first area is an unwritten state, the state of the target second area to a written state, the target first area being the first area into which the first data is to be written, the target second area being the second area into which the first data is to be written, and
when the state of the target second area indicated in the first management information is the written state, setting all of the second areas other than the target second area indicated in the management information to the unwritten state, and updating the counter value for the target first area.

15. The device according to claim 1, wherein in the wear leveling control,
the hardware processor controls a position into which data is written on the basis of the counter value for each of the plurality of first areas in such a manner that data are evenly written to a whole area in the nonvolatile memory.

* * * * *